July 18, 1961 F. C. ROBINSON 2,992,832
BOAT TRAILER SHOE
Filed Dec. 15, 1959

*INVENTOR.*
FRANK C. ROBINSON
BY
*Victor J. Evans & Co.*
*ATTORNEYS*

United States Patent Office 2,992,832
Patented July 18, 1961

2,992,832
BOAT TRAILER SHOE
Frank C. Robinson, 2 N. 79th Ave., Yakima, Wash.
Filed Dec. 15, 1959, Ser. No. 859,718
2 Claims. (Cl. 280—24)

This invention relates to boat trailers and particularly apparatus for launching and retrieving small boats, such as towed by passenger vehicles, and in particular a shoe or skid designed to be positioned between a trailer having a boat thereon, and a towing vehicle, whereby a boat may be retrieved or launched without backing a towing vehicle too close to the water.

The purpose of this invention is to provide means for launching and retrieving boats without danger of being mired down in wet sand.

Boats are retrieved, either by backing a trailer into the water and floating a boat thereon, or by using a crank and cable. In using either method it is necessary to back the towing vehicle down to the water's edge, and in numerous instances it is difficult to locate a beach or opening suitable for driving to the edge of the water.

With this thought in mind this invention contemplates a shoe having a flat base plate with a tongue extended from the leading edge and with a hitch ball on a raised portion also on the leading edge, and in which the extended end of the tongue is provided with a chain having a ring in the extended end, the hitch ball being provided for receiving a hitch socket of a boat trailer and the ring in the end of the chain being positioned to be placed over a hitch ball on the bumper of a vehicle.

The object of this invention is, therefore, to provide a shoe which forms a connector between a boat trailer and a towing vehicle.

Another object of the invention is to provide means for connecting a towing vehicle to a boat trailer which obviates the necessity of backing a vehicle into the water.

Another important object of the invention is to provide a shoe for connecting a towing vehicle to a boat trailer in which the parts may be attached in a comparatively few seconds.

A further object is to provide a boat trailer shoe which is of a simple and economical construction.

With these and other objects and advantages in view the invention embodies a rectangular-shaped base plate, a tongue extended from the leading edge of the base plate, a box-like section extended upwardly from the leading portion of the base plate, a plate spaced upwardly from the base plate and extended from the box-like section to the trailing edge of the base plate, a hitch ball positioned on said box-like section, and a chain having a ring in the extended end secured in the leading end of the tongue.

Other features and advantages of the invention will appear from the following description taken in connection with the drawings, wherein.

Figure 1:
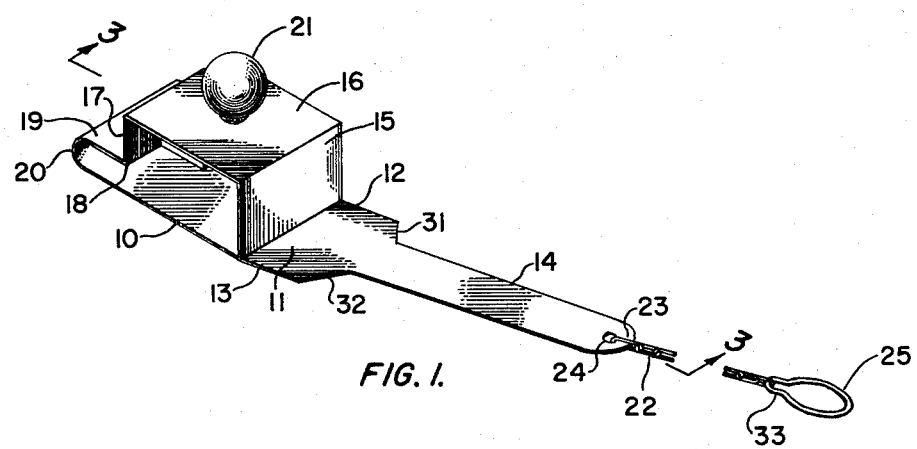
FIGURE 1 is a perspective view showing the boat trailer shoe of this invention.
Figure 2:
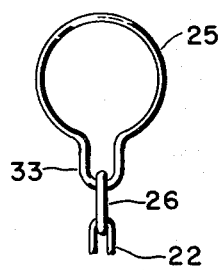
FIGURE 2 is a view showing a ring in the end of a chain extended from the leading end of a tongue of the shoe, the ring being positioned to be placed over a hitch ball of a towing vehicle.
Figure 3:
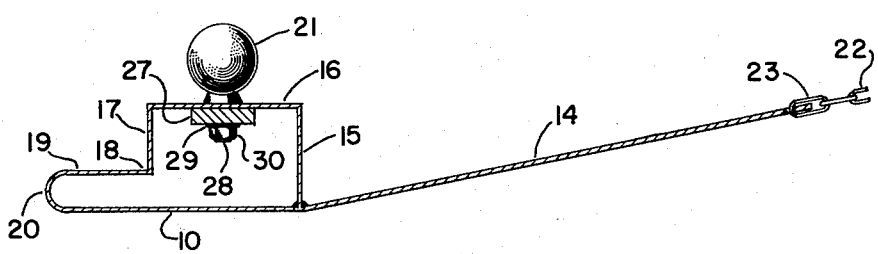
FIGURE 3 is a longitudinal section taken on line 3—3 of FIGURE 1.

Referring now to the drawing wherein like reference characters are used to designate corresponding parts the shoe of this invention includes a base plate 10 having a section 11 with tapering edges 12 and 13 extending from the leading end, and from which a tongue 14 extends, a box-like section having a front wall 15, an upper panel 16 parallel to the base plate and spaced upwardly therefrom, and a rear wall 17 extended from the rear edge of the upper panel to a point 18, a horizontally disposed plate 19 extended rearwardly from the lower edge of the rear wall 17 to the trailing end of the base plate, to which the plate 19 is connected by an arcuate portion 20, a hitch ball 21 positioned on the box-like section, a chain 22 secured by a link 23 in an opening 24 in the end of the tongue, and a ring 25 secured in a link 26 at the end of the chain.

The lower edge of the front wall 15 is secured to the base plate 10 by welding, or the like, and the upper panel 16 is reinforced by a bar 27 through which a stud 28 depending from the ball 21 extends. The lower end of the stud is provided with a washer 29 and a nut 30 whereby the ball is retained in position on the box-like portion of the shoe. The leading end of the section 11 of the base plate is provided with beveled edges 31 and 32.

The ring 25 is provided with a U-shaped portion 33 in which the link 26 of the chain 22 is positioned.

With the parts assembled as illustrated and described the shoe is positioned at the edge of the water and on one side of the tongue of a boat trailer. The tongue of the trailer is positioned over the shoe and the conventional ball receiving socket clamped over the ball 21 of the shoe. The ring 25 in the leading end of the chain in the end of the tongue 14 is placed over a hitch ball of a towing vehicle, and with the towing vehicle on solid ground the trailer with a boat thereon is drawn from the water.

By the same means the boat may be launched in the water.

It will be understood that modifications, within the scope of the appended claims, may be made in the design and arrangement of the parts without departing from the spirit of the invention.

What is claimed is:

1. In a boat trailer shoe, the combination which comprises a base plate, a tongue integral with and extended upwardly from the leading edge of the base plate, a box-like section positioned on the base plate, a horizontally disposed plate extended from the box-like section to the trailing end of the base plate and spaced upwardly from the base plate, the trailing edge of the horizontally disposed plate being formed integral with the trailing edge of the base plate by an arcuate section so that said horizontally disposed plate and said box-like section will overlie said base plate in spaced parallel relation thereto, a hitch ball positioned on said box-like section, and means connecting the end of the tongue to a towing vehicle.

2. In a boat trailer shoe, the combination which comprises an elongated base plate having a section with beveled edges at the leading end, a tongue integral with and extended upwardly from the leading end of the base plate in inclined relation thereto, a chain secured in the extended end of the tongue, a ring in the end of the chain, a box-like section positioned on the leading portion of the base plate, a hitch ball positioned on said box-like section, said box-like section having a front wall, the lower edge of which is welded to the forward portion of the base plate and a rear wall the lower edge of which is spaced from the base plate, the trailing edge of the base plate curving upwardly in a semi-circle and merging into a horizontally disposed plate extended from the lower edge of said rear wall of the box-like section so that said horizontally disposed plate and said box-like section are positioned in spaced parallel relation to each other, reinforcing means in said box-like section, and means securing said hitch ball in position on said box-like section.

References Cited in the file of this patent
UNITED STATES PATENTS

| | | |
|---|---|---|
| 1,210,694 | Ritchie | Jan. 2, 1917 |
| 2,132,744 | McCraw | Oct. 11, 1930 |
| 2,150,010 | Solomon | Mar. 7, 1939 |
| 2,528,890 | Lawrence | Nov. 7, 1950 |
| 2,704,989 | Konecny | Mar. 29, 1955 |
| 2,723,130 | Andrews | Nov. 8, 1955 |
| 2,844,389 | Burnett | July 22, 1958 |